(12) United States Patent
Barr et al.

(10) Patent No.: US 8,640,124 B2
(45) Date of Patent: *Jan. 28, 2014

(54) MULTI-INSTALLER PRODUCT ADVERTISING

(75) Inventors: Paul C. Barr, Redmond, WA (US); Nnaemeka M. C. Nduaguba, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1350 days.

This patent is subject to a terminal disclaimer.

(21) Appl. No.: 11/623,182

(22) Filed: Jan. 15, 2007

(65) Prior Publication Data

US 2008/0172736 A1 Jul. 17, 2008

(51) Int. Cl.
*G06F 9/445* (2006.01)
(52) U.S. Cl.
USPC .......................... 717/176; 717/168; 717/178
(58) Field of Classification Search
USPC .................. 717/168–178; 707/723–724, 770; 709/220–231
See application file for complete search history.

(56) References Cited

U.S. PATENT DOCUMENTS

| | | | |
|---|---|---|---|
| 5,247,683 A | 9/1993 | Holmes et al. | 395/700 |
| 6,075,943 A | 6/2000 | Feinman | 395/712 |
| 6,131,192 A | 10/2000 | Henry | 717/11 |
| 6,269,377 B1 | 7/2001 | Collie et al. | |
| 6,279,154 B1 | 8/2001 | Davis | |
| 6,282,709 B1 | 8/2001 | Reha et al. | |
| 6,289,512 B1 | 9/2001 | Edwards et al. | 717/11 |
| 6,301,708 B1 | 10/2001 | Gazdik et al. | 717/11 |
| 6,327,705 B1 | 12/2001 | Larsson et al. | |
| 6,345,386 B1 * | 2/2002 | Delo et al. | 717/176 |
| 6,378,127 B1 | 4/2002 | Delo | |
| 6,385,766 B1 * | 5/2002 | Doran et al. | 717/174 |
| 6,401,241 B1 | 6/2002 | Taylor | 717/174 |
| 6,408,434 B1 | 6/2002 | Fujiwara | |

(Continued)

FOREIGN PATENT DOCUMENTS

| | | |
|---|---|---|
| EP | 1 594 055 A1 | 9/2005 |
| GB | 2 416 046 A | 11/2006 |
| WO | WO 2007/133347 A1 | 11/2007 |

OTHER PUBLICATIONS

"Impersonate a client after authentication" published Jan. 21, 2005. Http://msdn.microsoft.com/en-us/library/cc787897.aspx.*

(Continued)

*Primary Examiner* — Satish Rampuria
(74) *Attorney, Agent, or Firm* — Merchant & Gould

(57) ABSTRACT

Methods, computer program products, and systems advertise multi-installer programs in a local system context with single installer deployment. A method involves initiating in a local system a custom action associated with a core installer of a multi-installer program, finding a satellite installer associated with the core installer, and gathering data associated with the local system on which the multi-installer program is to be advertised. The method also involves scheduling another custom action for later execution to advertise the satellite installer, spawning from within the custom action the other custom action by leveraging privileges associated with installing the core installer on the local system, impersonating a target user of the local system, accessing pre-generated scripts associated with the satellite installers, and advertising the satellite installers via the local system. Pre-generated scripts of the satellite installers are accessed and the scripts are applied to the target user to facilitate satellite installer advertisement/assignment.

17 Claims, 5 Drawing Sheets

(56) References Cited

U.S. PATENT DOCUMENTS

| | | | |
|---|---|---|---|
| 6,418,554 | B1 | 7/2002 | Delo et al. |
| 6,427,227 | B1 | 7/2002 | Chamberlain |
| 6,493,871 | B1 | 12/2002 | McGuire et al. |
| 6,604,237 | B1 | 8/2003 | Giammaria |
| 6,675,382 | B1 | 1/2004 | Foster ............................ 717/177 |
| 6,735,766 | B1 | 5/2004 | Chamberlain |
| 6,966,060 | B1 | 11/2005 | Young |
| 6,973,647 | B2 | 12/2005 | Crudele et al. |
| 7,047,529 | B2 | 5/2006 | Delo ............................... 717/174 |
| 7,073,172 | B2 | 7/2006 | Chamberlain ................ 717/169 |
| 7,107,588 | B2 | 9/2006 | Gentry ........................... 717/176 |
| 7,802,246 | B1* | 9/2010 | Kennedy et al. .............. 717/173 |
| 2002/0059425 | A1 | 5/2002 | Belfiore |
| 2002/0087876 | A1 | 7/2002 | Larose .......................... 713/200 |
| 2002/0095671 | A1 | 7/2002 | Delo et al. |
| 2003/0005166 | A1 | 1/2003 | Seidman |
| 2003/0009752 | A1 | 1/2003 | Gupta ........................... 717/171 |
| 2003/0037326 | A1* | 2/2003 | Burkhardt et al. ............ 717/178 |
| 2003/0037327 | A1 | 2/2003 | Cicciarelli et al. ............ 717/178 |
| 2003/0046680 | A1 | 3/2003 | Gentry |
| 2003/0084439 | A1* | 5/2003 | Perkins et al. ................ 717/177 |
| 2003/0145317 | A1 | 7/2003 | Chamberlain |
| 2003/0208685 | A1 | 11/2003 | Abdel-Rahman ............. 713/191 |
| 2003/0225851 | A1 | 12/2003 | Fanshier et al. |
| 2003/0233483 | A1 | 12/2003 | Melchione et al. |
| 2004/0098706 | A1 | 5/2004 | Khan et al. |
| 2004/0143830 | A1* | 7/2004 | Gupton et al. ................ 717/174 |
| 2004/0169686 | A1 | 9/2004 | Zimniewicz et al. |
| 2004/0177355 | A1 | 9/2004 | Wragge |
| 2004/0210893 | A1 | 10/2004 | Chamberlain et al. |
| 2004/0243994 | A1 | 12/2004 | Nasu |
| 2004/0249919 | A1 | 12/2004 | Mattheis |
| 2004/0255291 | A1* | 12/2004 | Sierer et al. ................... 717/174 |
| 2004/0261053 | A1 | 12/2004 | Dougherty et al. |
| 2005/0010547 | A1 | 1/2005 | Carinci et al. |
| 2005/0108704 | A1 | 5/2005 | Marinelli et al. |
| 2005/0120106 | A1 | 6/2005 | Alberto |
| 2005/0172283 | A1 | 8/2005 | Delo |
| 2005/0204356 | A1 | 9/2005 | Sandarajan et al. |
| 2005/0216906 | A1 | 9/2005 | Shahindoust et al. |
| 2005/0262076 | A1 | 11/2005 | Voskuil |
| 2005/0289538 | A1 | 12/2005 | Black-Ziegelbein et al. |
| 2006/0010435 | A1 | 1/2006 | Jhanwar et al. |
| 2006/0041572 | A1 | 2/2006 | Maruyama |
| 2006/0048134 | A1 | 3/2006 | Napier et al. |
| 2006/0048136 | A1* | 3/2006 | Vries et al. .................... 717/174 |
| 2006/0080656 | A1* | 4/2006 | Cain et al. ..................... 717/174 |
| 2006/0161915 | A1* | 7/2006 | Barr et al. ..................... 717/174 |
| 2006/0174223 | A1 | 8/2006 | Muir et al. |
| 2006/0230397 | A1 | 10/2006 | Cook et al. .................... 717/174 |
| 2006/0232663 | A1 | 10/2006 | Gandhi et al. |
| 2006/0265706 | A1* | 11/2006 | Isaacson et al. .............. 717/174 |
| 2007/0055766 | A1* | 3/2007 | Petropoulakis et al. ....... 709/224 |
| 2007/0256068 | A1 | 11/2007 | Barr et al. |
| 2007/0256072 | A1 | 11/2007 | Barr et al. |
| 2008/0028389 | A1 | 1/2008 | Genty et al. |
| 2008/0172664 | A1 | 7/2008 | Barr et al. |

OTHER PUBLICATIONS

How to: Use Windows Authentication in ASP.NET 2.0: published Aug. 2005 by J.D. Meier, Alex Machman, Blaine Wastell, Prashant Bansode, Andy Wigley, Kishore Gopalan. Http://msdn.microsoft.com/en-us/library/ff647405.aspx.*

"Waiting to Install" published Jan. 23, 2006 by Heath Stewart. Http://blogs.msdn.com/b/heaths/archive/2006/01/23/516454.aspx.*

Gentleman, "Managing Configurability in Multi-installation Realtime Programs", Proceedings of the Canadian Conference on Electrical and Computer Engineering, Vancouver, B.C., Nov. 3-4, 1989, pp. 823-827.*

Touesnard, Brad. "Design of a Universal Web Application Installer." (2005), pp. 1-18.*

Dearle, Alan. "Software deployment, past, present and future." 2007 Future of Software Engineering. IEEE Computer Society, 2007, pp. 1-16.*

CN Office Action, dated Jun. 10, 2010, mailed in Application No. 200780015940.6 pp. 1-9.

U.S. Office Action dated Jan. 10, 2011, in U.S. Appl. No. 11/414,998, pp. 1-17.

Coupaye, T. et al., "Foundations of enterprise software deployment", Software Maintenance and Reengineering, 2000. Proceedings of the Fourth European Feb. 29 through Mar. 3, 2000, pp. 65-73. http://ieeexplore.ieee.org/search/wrapper.jsp?arnumber=827313.

DameWare MSI, "Windows Installer Options for Dameware MSI Files", Nov. 10, 2004, pp. 1-4 <Dameware_MSI_04.pdf>; 3 pgs.

Dillinger, M. et al., "Decentralized software distribution for SDR terminals", Apr. 2002, IEEE, vol. 9, Issue 2, pp. 20-25.

Dolstra, E. et al., "Imposing a memory management discipline on software deployment", Proceedings 26th Intn'l Conference on May 23-28, 2004. pp. 583-592. http://ieeexplore.ieee.org//search/wrapper.jsp?arnumber=1317480.

Koivunen, Erka et al., "Policy Management in Windows NT", Original Version Nov. 29, 1999, Revised Jan. 10, 2000, 21 pgs., http://www.tml.tkk.fi.Opinnot/Tik-110.501/1999/papers/policynt/policynt.html.

Sahin, I. et al., "Policy analysis for warranty, maintenance, and upgrade of software systems", Journal of Software Maintenance and Evolution: Research and Practice, vol. 13, Issue 6, pp. 469-493, published online Dec. 13, 2001. http://www3.interscience.wiley.com/cgi-bin/abstract/8513464/ABSTRACT.

EP Communication mailed Sep. 6, 2009, cited in Application No. 07 754 734.7, pp. 1-6.

European Search Report dated Sep. 14, 2007, Application No. PCT/US2007/008257, pp. 1-7.

European Search Report dated Apr. 6, 2009, Application No. PCT/US2007/008257, pp. 1-8.

Office Action mailed Jul. 8, 2010, cited in U.S. Appl. No. 11/414,998, pp. 1-17.

U.S. Official Action dated Aug. 16, 2010 in U.S. Appl. No. 11/415,329, pp. 1-25.

Tobias Oetiker et al., "SEPP—Software Installation and Sharing System," originally published in the Proceedings of the Twelfth Systems Administration Conference (LISA '98), Boston, Massachusetts, Dec. 6-11, 1998, http:/www.usenix.org/event/lisa98/full_papers/oetiker2/oetiker2.pdf.

Simon George et al., "Automated Software Packaging and Installation for the ATLAS Experiment," http://www.pp.rhul.ac.uk/hep/pubs2/2003/_grid03-09.pdf.

Quick Tour of WinINSTALL 7.5, QT18: Advertising Software for Installation, Jul. 2003, pp. 1-8, http://ondemandsoftware.com/qts/guides/QuickTours/Quick Tours/QT18_DistSW_Advertising.doc.

Using InstallAware 6 to Deploy Microsoft.NET Framework Applications, Jun. 2006, pp. 1-27, http://www.installaware.com/installaware_deploy_dotnet.pdf.

V. N. Venkatakrishnan et al. "An Approach for Secure Software Installation," Computer Science Department, Suny at Stony Brook, pp. 219-226 of the Proceedings of LISA '02: Sixteenth Systems Administration Conference (Berkeley, CA USENIX Association, 2002), http://www.usenix.org/events/lisa02/tech/full_papers/venkatakrishnan/venkatakrishnan.pdf.

Kenneth Manheimer et al., "The Depot: A Framework for Sharing Software Installation Across Organizational and UNIX Platform Boundaries," LISA IV, Oct. 17-19, 1990, Colorado Springs, Colorado, pp. 37-46, http://citeseer.ist.psu.edu/cache/papers/cs/3989/ftp:zSzzSzftp.stna.dgac.frzSzpubzSzsystemzSzadminzSzdepotzSzlisa-paper.pdf/manheimer90depot.pdf.

U.S. Office Action dated Apr. 12, 2011 in U.S. Appl. No. 11/623,191, 37 pgs.

U.S. Office Action dated Jul. 7, 2011, in U.S. Appl. No. 11/414,998, 18 pgs.

U.S. Office Action dated Jan. 25, 2012, in U.S. Appl. No. 11/414,998, 22 pages.

(56) References Cited

OTHER PUBLICATIONS

U.S. Office Action dated Oct. 13, 2011 in U.S. Appl. No. 11/623,191, filed Jan. 15, 2007, Applicant name: Barr et al., 35 pages.
U.S. Office Action dated Jan. 2, 2013, in U.S. Appl. No. 11/623,191, 38 pages.
U.S. Office Action mailed May 29, 2013 in U.S. Appl. No. 11/623,191, 36 pages.
U.S. Office Action dated Jun. 5, 2012, in U.S. Appl. No. 11/623,191, 42 pages.

* cited by examiner

MULTI-INSTALLER PRODUCT ADVERTISING

BACKGROUND

Many small to medium sized business organizations have a network infrastructure to allow software product distribution by a network administrator. Software products may be installed on the client by the network administrator by manually installing the program on each client. Such installation is very time consuming and tedious. A network administrator may also use a software deployment technology to advertise available software for download to a client. Such deployment comes from a central server and is less time consuming than manual installation because software products may be advertised to a plurality of clients at one time.

Advertising is a method by which a software product is prepared and allowed to become installable on a machine. Some operating systems have support for "advertising" software products which are packaged in a single product installer format. Single product installers facilitate the installation of the software product on a client via a software deployment technology. In such a situation, the single product installer bundles both the application binaries and application specific resources. Thus, many software deployment technologies only deploy a single product installer to a client during software distribution. An operating system may natively support installing these single product installer software packages to computers which are joined to, for example, a managed Active Directory Domain. This technology is called Group Policy Software Installation (GPSI).

Software products may also be programmed with multiple product installers. In such a situation, one product installer may include the application binaries and multiple other installers may include the application specific resources. In the past, software deployment technologies that can only deploy a single product installer cannot facilitate advertisement of software products that are programmed with multiple product installers to a managed computer, for example on the Active Directory Domain.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter.

A custom action is associated with a core installer to leverage the privileges of the core installer to advertise satellite installers on a client device. The custom action allows multi-installer software products to be installed in an advertised state on a client or target computer via a software deployment technology configured for single installer software products. In this manner, multi-installer software products may be easily deployed and advertised on client devices.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
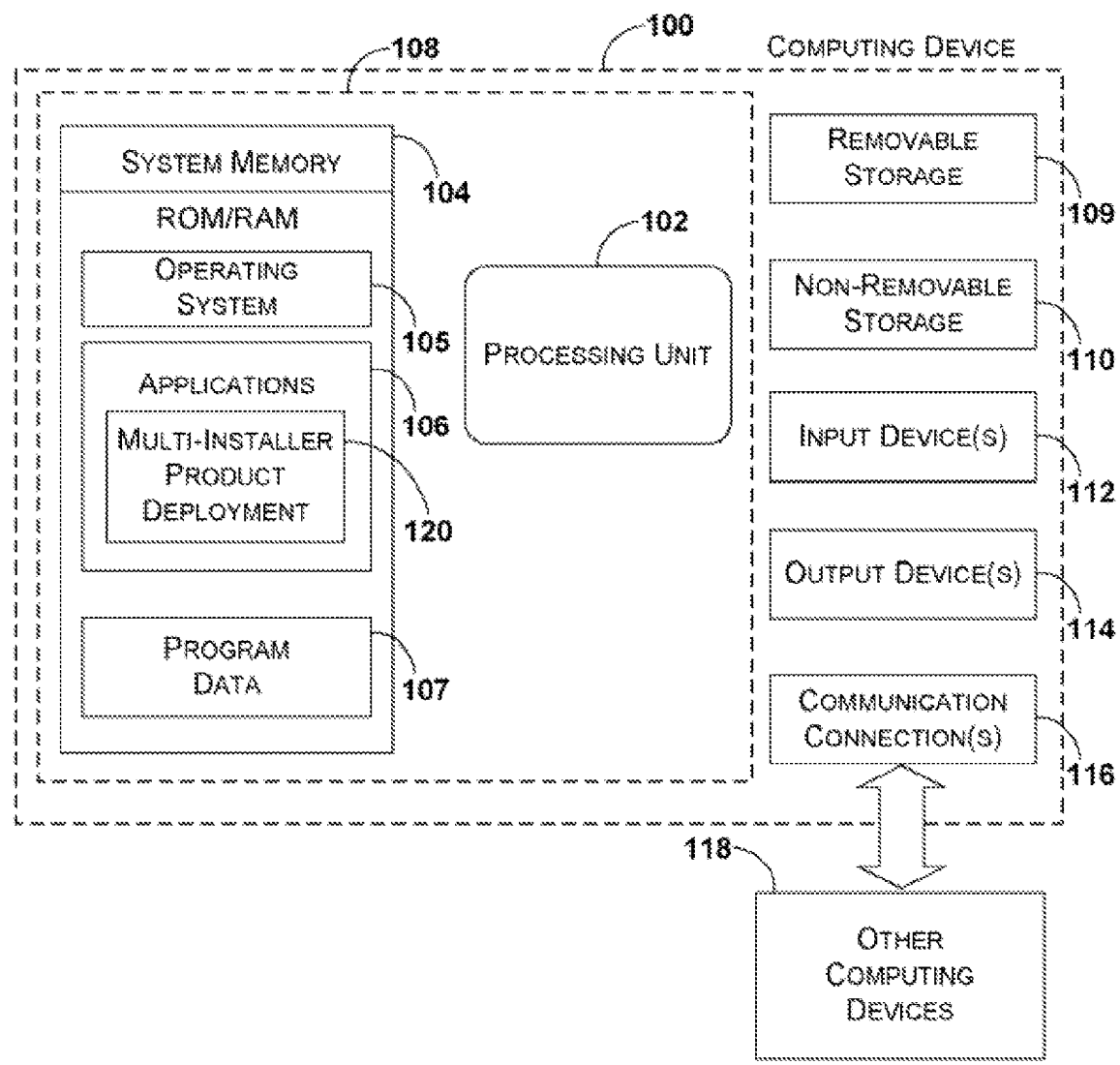
FIG. 1 illustrates an exemplary computing device.

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems, computer program products, or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments described herein are referred to alternatively as operations, steps or modules.

In a small to medium sized business organization, software products are installed on client machines in many different ways. When a user has administrative rights to a client device, the user may download software products from the Internet or install a software product from a computer readable medium. Such rights are rarely issued to a user in a typical business setting because the business organization desires maintaining control over the software that the user has on the client device. For these reasons, may business organizations have restricted privileges for users on client devices. These restricted privileges may prohibit installation of software products.

In such situations, a network administrator may have the responsibility of maintaining and installing software on client devices. To install software products on a client device, the network administrator may be required to manually install the software on each client device. The network administrator logs onto the client device with heightened privileges. The network administrator may then install the software product onto the client device. Installing software products in this manner may be acceptable in business organizations with a small number of client devices. However, as the number of client devices increase, so does the time and labor required to install software products on each of the client devices.

When a network administrator desires installing a software product on several devices, the network structure of the business organization may allow the network administrator to utilize a software deployment technology to remotely install software on the client devices. A software deployment technology may facilitate the installation of a software product having a single installer. A single installer software product is a software product that includes both the application binaries and the application specific resources bundled into a single installer. The software deployment technology advertises the single installer of the software product on the client device. When an install action is instigated, the software product is installed on the client device.

Some software products may also include multiple installers. In such a situation, the software product may include a core installer that is associated with the application binary. The software may also include multiple satellite installers that are associated with application resources. Multi-installer software products may present problems for software deployment technologies that are configured to only install software products that have a single installer, because such software deployment technologies only recognize one installer.

A properly configured custom action allows a software product with multiple installers to be installed using such a software deployment technology. A custom action is associated with the core installer of the software product. The software deployment technology advertises the core installer on the client device. When an install action is instigated, the custom action associated with the core installer is executed. The source of the core installer is identified and the source is scanned to determine whether satellite installers are associated with the software product. If satellite installers are associated with the product, the custom action schedules and spawns other custom actions to impersonate a target client user or machine account in order to access script associated with the satellite installers and advertise the satellite installers on the client for facilitating installation.

Succinctly stated, the custom action associated with the core installer leverages the privileges of the core installer to install satellite installers on a client device, for example a machine with restricted privileges for users. The custom action allows multi-installer software products to be advertised on a client via a software deployment technology configured for single installer software products. In this manner, multi-installer software products may be easily deployed and advertised on client devices.

Figure 2:
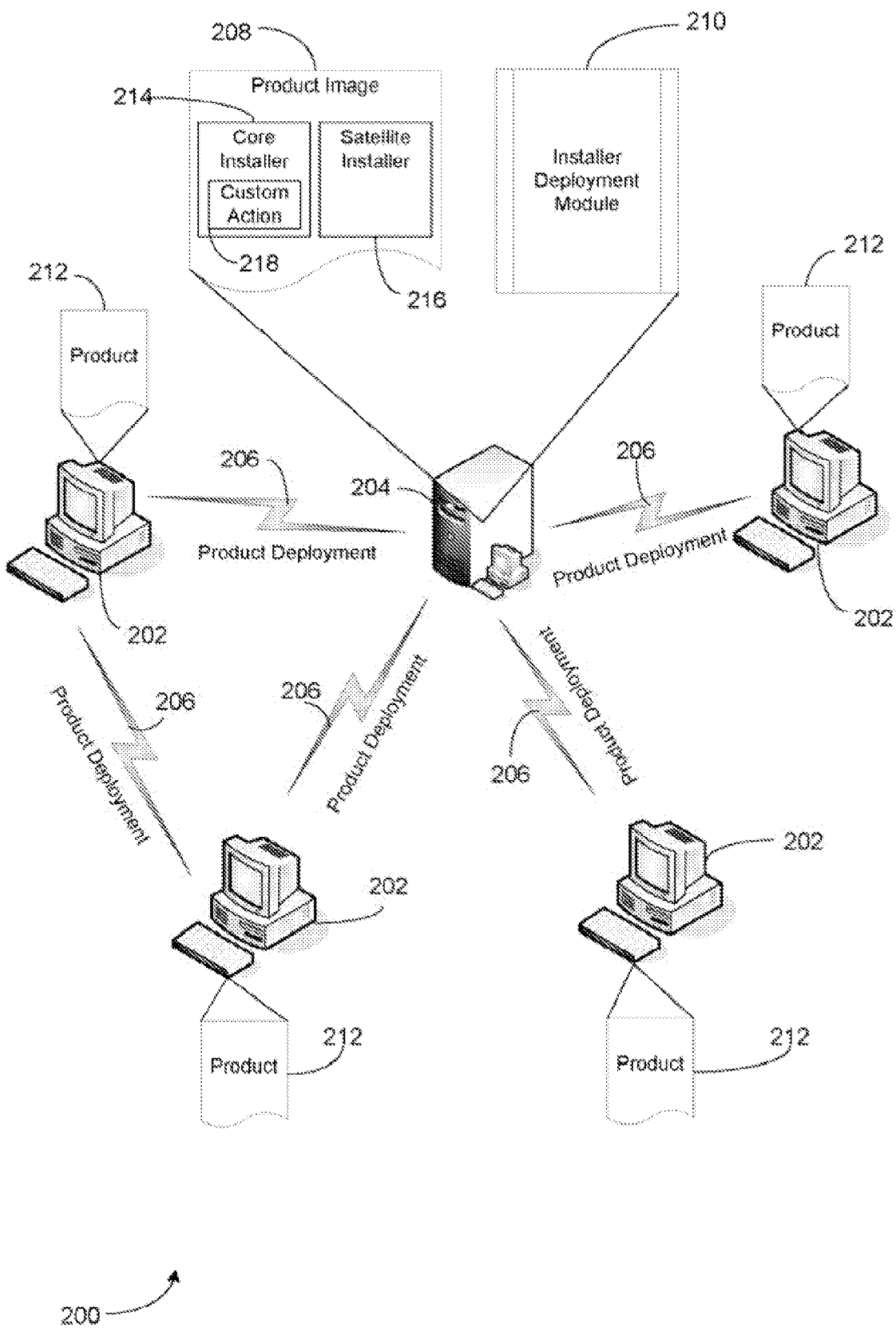
FIG. 2 represents one exemplary environment for deploying a software product via a network.

FIG. 2 represents one exemplary environment for deploying a multi-installer software product in a network. System 200 represents a modular overview of a computing environment. System 200 may include computing device 202. Computing device 202 may include a desktop computing device, mobile computing device, a laptop, a personal digital assistant, a notebook computer, and/or any other type of computing device functional to store data. In one aspect, computing device 202 includes computing device 100 as exemplified in FIG. 1.

System 200 also includes server 204. Server 204 may be associated with an administrator terminal. Server 204 may include any type of server that facilitates product deployment in a networked environment. Server 204 is in communication with computing device 202 via network connection 206. Network connection 206 may include a hardwired network connection and/or a wireless network connection. Network connection 206 may include any type of network connection functional to transmit data between a computing device and a server or between computing devices. Network connection 206 includes any type of network connection that facilitates product deployment.

In the distributed environment, server 204 and/or client 202 may include product image 208 and installer deployment module 210. For example, an administrator may associate product image 208 with server 204 to facilitate product deployment to client 202. Client 202 may install product 212 on client 202. It should also be appreciated that product image 208 may be associated with a file share or one client 202 to facilitate product deployment to another client 202.

In one embodiment, product 212 is a multi-installer product, such as, a "MICROSOFT OFFICE" product of MICROSOFT CORPORATION headquartered in Redmond, Wash. In such a situation, product image 208 includes core installer 214 and satellite installer(s) 216. In another embodiment, installer deployment module 210 is a single installer deployment module, such as, "MICROSOFT ACTIVE DIRECTORY" of MICROSOFT CORPORATION headquartered in Redmond, Wash. Core installer 214 may include custom action 218. Core installer 214 is deployed by installer deployment module 210 during product deployment to client 202. Custom action 218 leverages the privileges of core installer 214 to install satellite installer(s) 216 when client 202 is in a lockdown mode.

Figure 3:
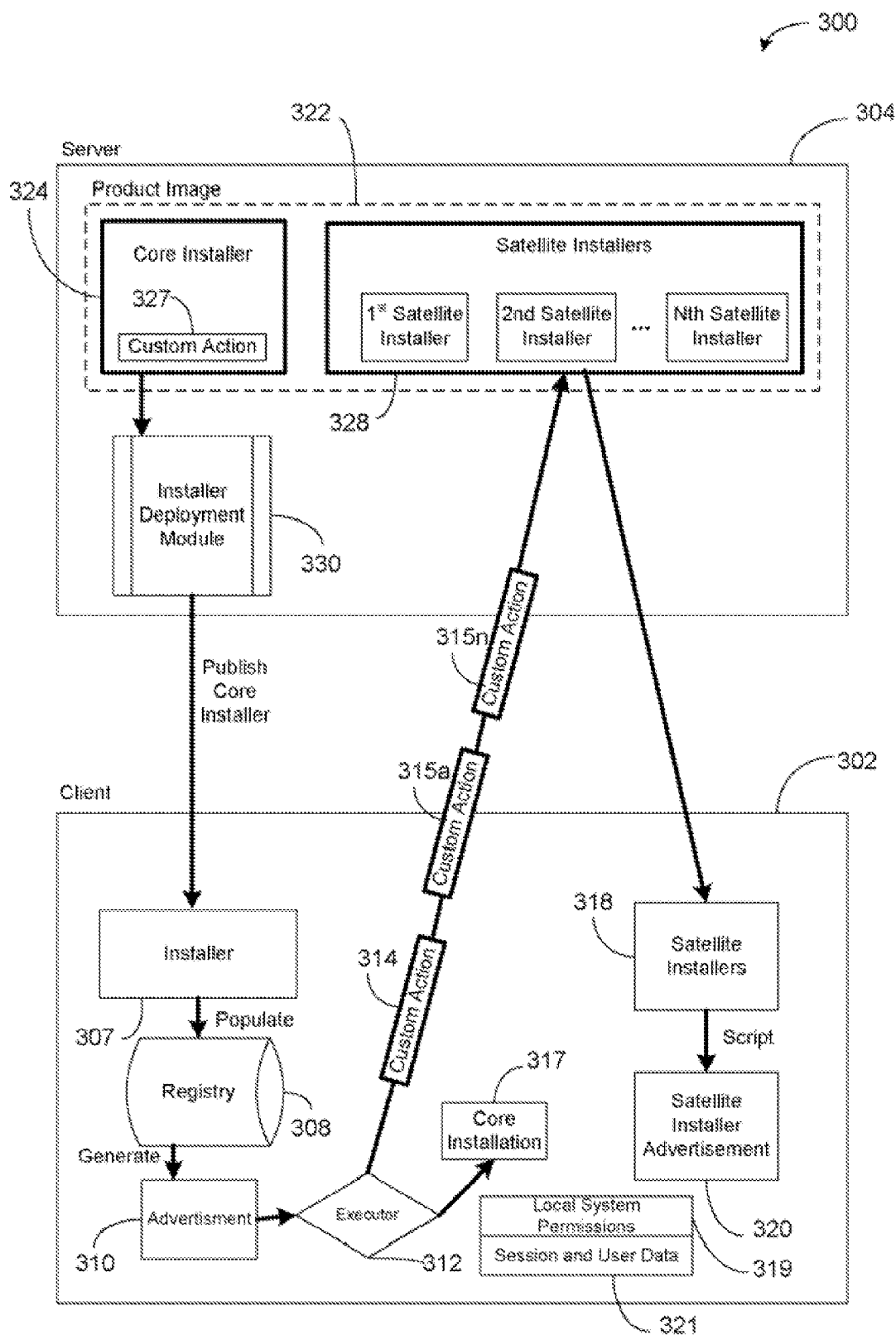
FIG. 3 represents one exemplary system overview for advertising a multi-installer product.

FIG. 3 represents one exemplary system overview for advertising a multi-installer product. System 300 represents a modular overview of client 302 and server 304. System 300 may be integrated as a combination of software an hardware elements, an operating system or any combination thereof. Hardware, databases, software, applications, and/or programs referenced herein may be integrated as a single element or include various elements in communication with one another. Software and/or hardware elements are depicted herein for explanatory purposes only and not for limiting the configuration to multiple elements or a single element performing several functions unless specifically specified herein. For instance, the product image 322 and the installer deployment module 330 may reside on a file share or another client computer in the network instead of on the server 304.

As depicted in FIG. 3, system 300 includes client 302 having installer 307, registry 308, advertisement 310, executor 312, custom action 314, spawned custom actions 315a-315n, core installation 317, satellite installers 318, satellite installer advertisement 320, local system permissions 319, and session and user data 321. Reference numbers 307-321 may include separate programs, separate databases and separate hardware. Reference numbers 307-321 may also include a single program or any combination of single and multiple programs. Similarly, system 300 includes server 304 having product image 322, core installer 324, custom action 327, satellite installers 328, and installer deployment module 330. Reference numbers 322-330 may include separate programs, separate databases and separate hardware. Reference numbers 322-330 may also include a single program or any combination of single and multiple programs.

Server 304 may be associated with product image 322. Product image 322 is a product image for a multi-installer product. Product image 322 includes core installer 324 and satellite installers 328. Core installer 324 includes the binary application bits for the product. For example, if product image 322 is a product image for "MICROSOFT OFFICE", core installer 324 may include the binary bits for "MICROSOFT WORE", "MICROSOFT EXCEL", "MICROSOFT OUTLOOK", "MICROSOFT POWERPOINT", and/or "MICROSOFT ACCESS." Core installer 324 also includes custom action 327. As is more fully set forth below, custom action 327 leverages privileges of core installer 324 to facilitate the advertisement and/or installation of satellite installers 328 on client 302.

Product image 322 also includes satellite installers 328. Satellite installers 328 may include any number of installers. In one aspect, satellite installers 328 include resource installers associated with core installer 324. Resource installers may include language resources, language resources from proofing, and/or any other type of resource associated with a language or geographic area. Satellite installers may pregenerate advertised scripts embedded therein. Core installer 324 and satellite installers 328 are separate installers that are associated with product image 322.

Installer deployment module 330 is a single installer deployment module. In one aspect, installer deployment module 330 includes MICROSOFT ACTIVE DIRECTORY. Installer Deployment module 330 publishes/assigns core installer 324 on client 302. To publish/assign core installer 324, installer deployment module 330 may generate a script and publish the script to client 302.

Client 302 receives the script. The script includes custom action 327. Installer 307 populates registry 308 with data from the script to generate advertisement 310. Advertisement 310 is an indicator that a software product is ready for installation on client 302. Executor 312 may include an icon and/or a button that a user actuates to begin an install. In another aspect, executor 312 is a boot process that begins an install. In either situation, core installer 324 is installed to client 302 and custom action 327 associated with core installer 324 is executed.

Custom action 327 executed on client 302 as custom action 314 spawns other custom actions 315a-315n that leverage privileges or permissions 319 of core installer 324 to access satellite installers 328. The other custom actions 315a-315n include code for impersonating a user of client 302 or a client machine account as defined by session an user data 321. As is more fully set forth below, custom action 327 includes code for identifying that a product includes multiple installers and that core installer 324 has been cached. Custom action 314 determines the product source and enumerates a list of satellite installers associated with product image 322. Satellite installers 328 are associated with client 302. Pre-generated scripts of satellite installers 328 are accessed and the scripts are applied to client 302 to facilitate satellite installer advertisement 310. To the end user, the installation process is seamless, as if, the product image includes a single installer. Additional details regarding advertising a multi-installer product will be described below with respect to FIG. 5.

Figure 4:
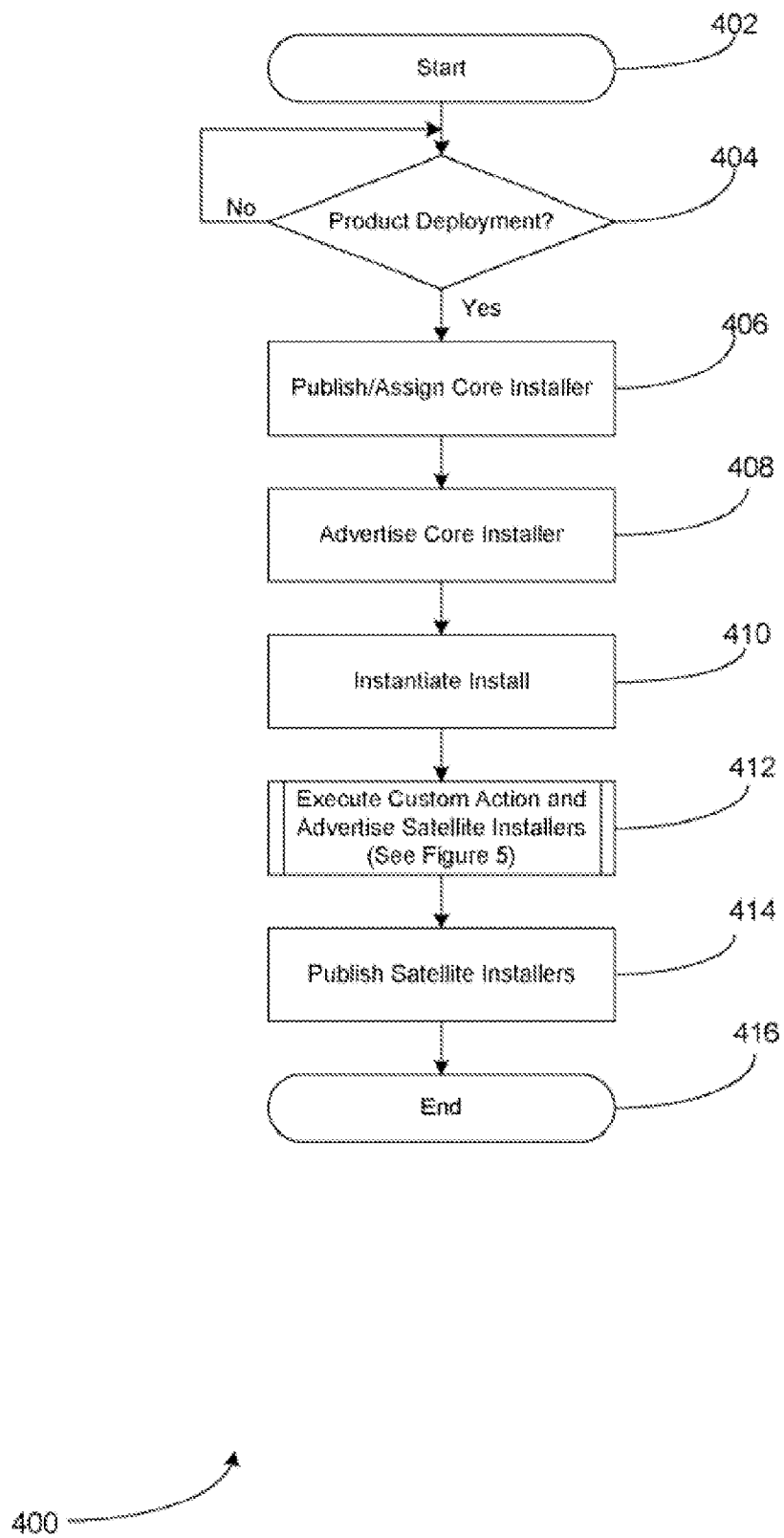
FIG. 4 represents an operational flow diagram for installing a multi-installer product.

FIG. 4 represents an operational flow diagram for deploying a multi-installer product. Operational flow 400 begins at start operation 402 and flows to decision operation 404. At decision operation 404 it is decided whether to issue a product deployment action. In one aspect, product deployment occurs when an administrator decides to distribute new and/or updated software products on a system of client devices. For example, a network administrator may decide to update client devices with MICROSOFT OFFICE 12. In one aspect, the product deployment is associated with a multi-installer software product.

Where product deployment is not desired, operational flow 400 loops back and waits for a product deployment action. Where product deployment is desired, operational flow 400 continues to operation 406. At operation 406, the core installer of a multi-installer software product is published/ assigned. In one aspect, a software deployment technology such as MICROSOFT ACTIVE DIRECTORY publishes the core installer to a client. Although not necessary, operational flow 400 may continue to operation 408 where the core installer is advertised. The core installer is advertised when the software deployment technology publishes the core installer to the client. The advertisement may include a displayed entry point or link where an install may be manually instantiated. In one respect the advertisement is not generated when the core installer is assigned to a client. When assigned, a boot process may automatically instantiate an install process.

Operational flow 400 continues to operation 410. Operation 410 includes instantiating an install. As stated above an install may be instantiated by selecting an entry point or running a boot process. Operational flow 400 continues to operate 412 where the custom action is executed. The custom action is a program that is associated with the core installer that leverages the privileges of the core installer when published/assigned. The custom action leverages the privileges of the core installer to access and advertise satellite installers for example, when the client device has restricted privileges for users. There are several Custom Actions that can make up a "Core Custom Action". Some of these Custom Action run during both per-user and per-machine deployment scenarios, some run during the per-machine deployment mode, and the others run during the per-user deployment mode where the target user has Admin privileges, and where the target user does-not have Admin privileges (i.e. lockdown mode). Operation 412 is more fully explained below in reference to FIG. 5.

Operational flow 400 continues to operation 414 where the satellite installers are published/assigned to the client device. To the end user, the functions of the custom action create an advertisement and install process as if the software product included a single installer. The advertised satellite installers may be installed by actuating an entry point or a boot process. Operational flow continues to end operation 416.

Figure 5:
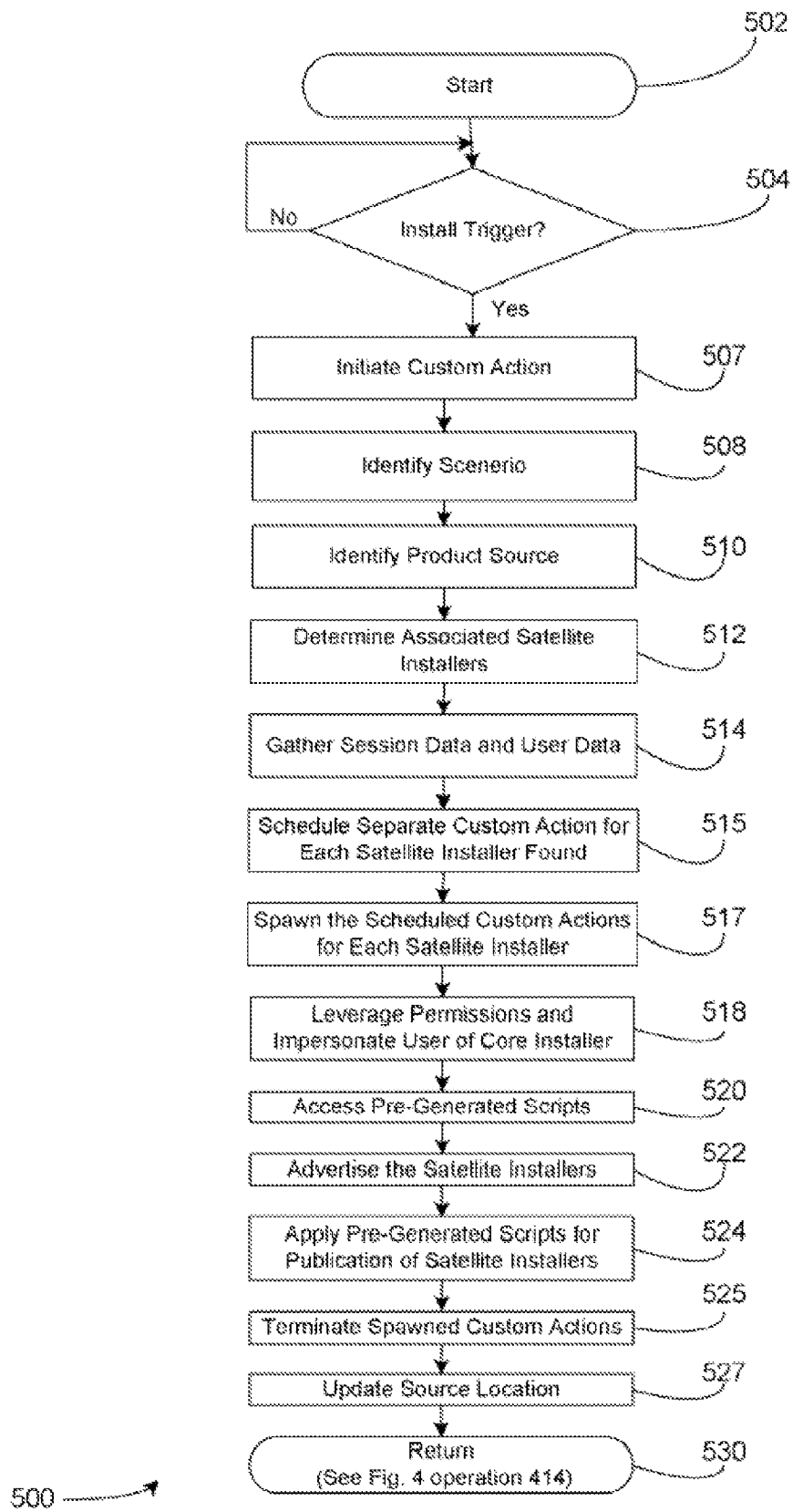
FIG. 5 represents an operational flow diagram for multi-installer product advertising.

FIG. 5 represents an operational flow diagram for multi-installer program advertising in a local system contest with single installer deployment. Operational flow 500 begins at start operation 502 and continues to decision operation 504. At decision operation 504, it is decided whether an install trigger has been actuated. As previously stated, an install trigger may be actuated by a user actuating an entry point. An install trigger may also be actuated by a boot operation. When an install trigger is actuated, operational flow 500 continues to operation 507. The custom action that is associated with the core installer is actuated or initiated when the install is actuated.

In executing the custom action, operational flow 500 continues to operation 508 where the scenario is identified. The custom action includes code to identify that the core installer has been cached. The custom action also includes code to identify that more installers are needed for a complete installation. When the scenario is identified, operational flow 500 continues to operation 510.

At operation 510, the software product source is identified. The custom action includes code to determine the source of the core installer. In finding the source, the custom action may associate an address with a location and/or find the source via an identifier. Operational flow 500 continues to operation 512 where the associated satellite installers are determined. When returning to the source, the custom action scans the source to determine if satellite installers are associated with the core installer. In determining associated satellite installers a list of satellite installers that are associated with the core installer may be generated. The multi-installer program may include the core installer and one or more satellite installers.

Operational flow 500 continues to operation 514 where data associated with the local system on which the multi-installer program is to be advertised is gathered. This data may be retrieved from local system permissions or session and user data residing on a client or target computer. The data may include a session identifier, a username, and/or a user domain associated with a machine account or a user currently logged in to the target computer. Operational flow 500 then continues to operation 515 where one or more other custom actions, each associated with a satellite installer, are scheduled for later execution to advertise the satellite installer(s).

Next, operation flow 500 continues to operation 517 where the custom action spawns the other custom actions. Once the other custom actions are spawned the custom action pauses. At operation 518 the other custom actions leverage privileges associated with installing the core installer on the local system in order to advertise the satellite installers. The other custom actions may leverage permissions or privileges of the core installer by impersonating a target user of the local system to ensure an accurate advertising target. Impersonating a target user may include collecting the session identifier, username, and/or user domain of the target user, retrieving an access token associated with the session identifier, and impersonating the access token. Impersonating may also include comparing the username and the user domain to a username and a user domain of the impersonated access token for validation therein executing in a security context of the target user.

Operational flow 500 continues to operation 520 where pre-generated scripts associated with the satellite installers are accessed. The satellite installers may include scripts that are pre-generated and coded into the satellite installers. The pre-generated scripts may include a set of default values. Operational flow 500 continues to operation 522 where the pre-generated scripts are advertised. At operation 524 the advertised scripts are applied to the client for publication/assignment to the client device.

Operational flow then continues to operation 525 where the spawned custom actions are terminated and the custom action is resumed. At operation 527 the source location is updated. In that the satellite installers include default values, after the scripts are applied, the actual values are accessed. Metadata associated with the satellite installers is also cleaned so that the satellite installers identify the same location as the core installer. Operational flow 500 returns control to other operational routines at return operation 530.

In this manner, the custom action associated with the core installer leverages the privileges of the core installer to advertise satellite installers on a client device. The custom action allows multi-installer software products to be advertised on a client via a software deployment technology configured for single installer software products. In this manner, multi-installer software products may be easily deployed and advertised on client devices. Advertising allows the satellite installers to become installable on the target computer without any additional privileges.

Referring to FIG. 1, an exemplary system for implementing the invention includes a computing device, such as computing device 100. In a basic configuration, computing device 100 may include any type of stationary computing device or a mobile computing device. Computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120 for multi-installer product deployment. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included.

Computing device 100 also contains communication connection(s) 116 that allow the device to communicate with other computing devices 118, such as over a network or a wireless network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for multi-installer program advertising in a local system context with single installer deployment, comprising:

initiating in a local system a custom action associated with a core installer of a multi-installer program, the custom action comprising advertising the multi-installer program on the local system via a software deployment technology configured only for single installer software products, the single installer software products comprising a software product including application binaries and application specific resources bundled into a single installer, the custom action further including code to identify that the core installer has been cached and code to identify that more installers are needed for a complete installation;

determining a source location of the core installer;
publishing the core installer, the core installer being advertised upon publication, the advertisement comprising a displayed entry point for manual instantiation of the complete installation;
determining at least one satellite installer associated with the core installer;
gathering data associated with the local system on which the multi-installer program is to be advertised wherein the multi-installer program comprises the core installer and the at least one satellite installer;
scheduling at least one other custom action for later execution to advertise the at least one satellite installer;
spawning from within the custom action the at least one other custom action by leveraging privileges associated with installing the core installer on the local system;
accessing pre-generated scripts associated with the at least one satellite installer;
advertising the at least one satellite installer via the local system;
updating a source location of the at least one satellite installer by accessing actual values instead of default values included in the pre-generated scripts;
cleaning metadata associated with the at least one satellite installer so that the source location of the at least one satellite installer identifies the source location of the core installer; and
actuating an install trigger to install the at least one satellite installer of the multi-installer program;
impersonating a target user of the local system from within the at least one other custom action to ensure an accurate advertising target wherein gathering data associated with the local system comprises collecting at least one identifier associated with the target user of the local system.

2. The method of claim 1, wherein impersonating the target user comprises:
collecting the at least one identifier wherein the at least one identifier comprises a session identifier of the target user;
retrieving an access token associated with the session identifier; and
impersonating the access token.

3. The method of claim 2, wherein impersonating the target user further comprises:
collecting the at least one identifier wherein the at least one identifier comprises a username of the target user and a user domain of the target user; and
comparing the username and the user domain to a username and a user domain of the impersonated access token for validation therein executing in a security context of the target user.

4. The method of claim 1, wherein advertising the at least one satellite installer comprises applying the pre-generated scripts to a correct target user.

5. The method of claim 4, further comprising terminating spawning of the at least one other custom action and returning to the custom action.

6. The method of claim 1, wherein advertising the at least one satellite installer comprises applying the pre-generated scripts for publication of a plurality of satellite installers.

7. The method of claim 1, wherein determining at least one satellite installer comprises finding a plurality of satellite installers associated with the core installer.

8. The method of claim 7, wherein the core installer includes application binaries and the satellite installers include resource strings.

9. The method of claim 1, further comprising impersonating a machine account of the local system before advertising the at least one satellite installer wherein gathering data associated with the local system comprises collecting data associated with the machine account therein utilizing permissions in a security context of the local system.

10. The method of claim 1, wherein advertising the at least one satellite installer comprises allowing the at least one satellite installer to become installable on the local system without any additional privileges.

11. A tangible computer-readable storage medium containing computer executable instructions which, when executed on a computing device, will cause the computing device to perform a method advertising satellite installers of a multi-installer program during installation of a core installer, the method comprising:
initiating a custom action associated with a core installer of a multi-installer program, the custom action comprising advertising the multi-installer program on the computing device via a software deployment technology configured only for single installer software products, the single installer software products comprising a software product including application binaries and application specific resources bundled into a single installer, the custom action further including code to identify that the core installer has been cached and code to identify that more installers are needed for a complete installation;
determining a source location of the core installer;
publishing the core installer, the core installer being advertised upon publication, the advertisement comprising a displayed entry point for manual instantiation of the complete installation;
finding satellite installers associated with the core installer;
collecting data associated with the computer on which the multi-installer program is to be advertised wherein the multi-installer program comprises the core installer and the satellite installers;
scheduling from within the custom action other custom actions for later execution to advertise the satellite installers;
spawning from within the custom action other custom actions to advertise the satellite installers by leveraging privileges associated with installing the core installer on the computer;
pausing the custom action; accessing pre-generated scripts associated with the satellite installers; and
applying the pre-generated scripts to a target user;
updating a source location of the satellite installers by accessing actual values instead of default values included in the pre-generated scripts;
cleaning metadata associated with the satellite installers so that the source location of the satellite installers identifies the source location of the core installer; and
actuating an install trigger to install the satellite installers of the multi-installer program;
impersonating the target user of the computer from within the other custom actions to ensure an accurate advertising target wherein collecting data associated with the computer comprises collecting at least one identifier associated with the target user of the computer.

12. The tangible computer-readable storage medium of claim 11, wherein impersonating the target user comprises:
collecting the at least one identifier wherein the at least one identifier comprises a session identifier of the target user;

retrieving an access token associated with the session identifier; and impersonating the access token.

13. The tangible computer-readable storage medium of claim 12, wherein impersonating the target user further comprises:

collecting the at least one identifier wherein the at least one identifier comprises at least one of the following:
a username of the target user; and
a user domain of the target user; and
comparing the username and the user domain to a username and a user domain of the impersonated access token for validation therein executing in a security context of the target user.

14. The tangible computer-readable storage medium of claim 11, further comprising computer-readable program code for causing the computer to terminate spawning of the other custom actions and resume the custom action.

15. A computer-implemented system for advertising scripts associated with satellite installers of a multi-installer product, the system comprising:

a memory and a processor coupled to the system;
an installer deployment module operative to publish a core installer to a local computer and initiate a custom action associated with the core installer of a multi-installer product, the custom action comprising advertising the multi-installer product on the local computer via a software deployment technology configured only for single installer software products, the single installer software products comprising a software product including application binaries and application specific resources bundled into a single installer;
code of the custom action operative to:
install the core installer;
identify that the core installer has been cached;
determine a source location of the core installer;
publish the core installer, the core installer being advertised upon publication, the advertisement comprising a displayed entry point for manual instantiation of the complete installation;
identify that more installers are needed for a complete installation;
find satellite installers associated with the core installer;
collect data associated with a target user currently logged on to the local computer on which the multi-installer program is to be advertised wherein the multi-installer program comprises the core installer and the satellite installers;
schedule from within the custom action other custom actions for later execution to advertise the satellite installers;
spawn from within the custom action other custom actions to advertise the satellite installers by leveraging privileges associated with installing the core installer;
update a source location of the satellite installers by accessing
actual values instead of default values included in the pre-generated scripts; and
clean metadata associated with the satellite installers so that the source location of the satellite installers identifies the source location of the core installer code of the other custom actions operative to:
pause the custom action;
access pre-generated scripts associated with the satellite installers;
apply the pre-generated scripts to a target user; and
actuate an install trigger to install the satellite installers of the multi- installer product, the install trigger being actuated by a boot process on the local computer:,
impersonate a target user of the local computer from within the custom action to ensure an accurate advertising target wherein gathering data associated with the local computer comprises collecting at least one identifier associated with the target user of the local computer.

16. The system of claim 15, wherein the code of the other custom actions is further operative to impersonate the target user of the local computer from within the other custom actions to ensure an accurate advertising target;

wherein the code of the custom action operative to collect data associated with the target user is operative to collect a session identifier, a username, and a user domain associated with the target user of the local computer; and
wherein the code of the other custom actions operative to impersonate the target user is operative to:
retrieve an access token associated with the session identifier; and
impersonate the access token;
compare the username and the user domain to a username and a user domain of the impersonated access token for validation therein executing in a security context of the target user.

17. The system of claim 15, wherein the code of the other custom actions is further operative to terminate spawning of the other custom actions and resume the custom action.

* * * * *